Nov. 3, 1964                L. H. FLORA                 3,154,826
                           FASTENING DEVICE
Filed Jan. 17, 1962                                    2 Sheets-Sheet 1

INVENTOR.
LAURENCE H. FLORA
BY
Teare, Felzer & Teare
ATTORNEYS

Nov. 3, 1964

L. H. FLORA 3,154,826

FASTENING DEVICE

Filed Jan. 17, 1962

INVENTOR.
LAURENCE H. FLORA

BY

Teare, Tetzer & Teare
ATTORNEYS

United States Patent Office 3,154,826
Patented Nov. 3, 1964

3,154,826
FASTENING DEVICE
Laurence H. Fiora, North Olmsted, Ohio, assignor to Timmerman Products, Inc., Cleveland, Ohio, a corporation of Ohio
Filed Jan. 17, 1962, Ser. No. 166,901
6 Claims. (Cl. 24—73)

This invention relates in general to fastening devices and deals, more particularly, with fastening devices in the form of clips, or the like, which are adapted to be attached to a ball point screw or the like for securing two or more parts together.

More specifically, the present invention is directed to fastener devices constructed from relatively thin material, such as sheet metal or the like, and designed for use with ball point screws or other such fastening means of like configuration, for positively securing the fastener in applied position without the danger of loosening or accidental removal, incident to vibration, jarring or other such conditions which may prevail in the environment to which the fastening clips are applied. The fastener is also provided with means for readily and quickly detaching the clip from assembled relation whenever necessary.

A specific illustration of the use to which the fastener of the present invention may be applied is the anchoring of the main plate of an automatic record player cabinet which permits the adjustment of the plate position for the desired shipping and playing conditions. Heretofore, difficulties have arisen in installing the fastener to the ball end of a ball point screw, utilized in adjustably securing the main plate of the cabinet to the base plate in an automatic record player, due to the tendency of the ball portion of the screw to extend beyond and out of engagement with the fastener, and the tendency of the screw or stud to cock or to snap out of alignment with the fastener during such installation. Further difficulty has arisen in providing a fastener that would positively entrap or lock the ball portion of the screw or stud relative to the base of the cabinet without the danger of accidental disengagement of the fastener therefrom. An additional difficulty has arisen in providing a fastener of a strength sufficient to bridge or span relatively large apertures or holes formed in the base of the cabinet, while at the same time minimizing the material cost of such fasteners.

This invention, therefore, primarily contemplates the provision of a relatively inexpensive fastener device which may be manufactured from sheet or strip material having spring-like characteristics, and which is adapted for fastening engagement with screws or the like, and which will positively lock itself in place and will prevent accidental disconnection of members secured thereby.

Another object of the present invention is to provide a fastener device, which may be easily and quickly secured to the ball portion of a screw or the like to prevent loosening or accidental removal of the fastener incident to vibration, jarring or other such conditions as prevail in the environment to which the fastener may be applied.

An additional object of the present invention is to provide a fastener device which may be easily and quickly secured to the ball portion of a screw or the like, to prevent over extension or disengagement and cocking of the fastener relative to the screw during such installation.

A further object of the present invention is to provide an inexpensive unitary fastener of sufficient strength and ruggedness to bridge or span relatively large apertures or holes that may be formed in the members to be secured.

A still further object of the present invention is to provide a fastener device which includes means for quickly and easily detaching it from secured relation on the ball portion of a screw or the like.

Further objects and advantages, and other new and useful features in the construction, arrangement and general combination of the elements of the fastening device will be apparent to those skilled in the art, as the following description proceeds with reference to the accompanying drawings.

FIG. 1 is an elevational view illustrating one environmental setting in which the fastening devices of the present invention may be advantageously used, and more particularly shows a portion of an automatic record player cabinet, wherein the main plate of the cabinet is adjustably held in playing and shipping (dotted-line) position by means of a fastener of the present invention locking or entrapping the ball portion of a ball point screw or stud;

Figure 1:
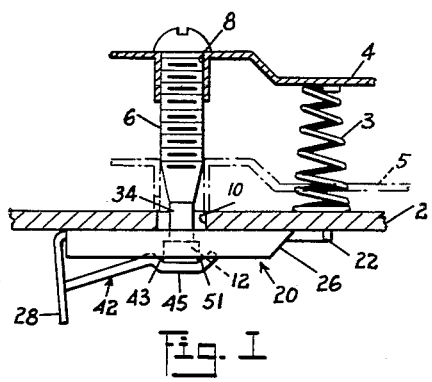
Figure 4:
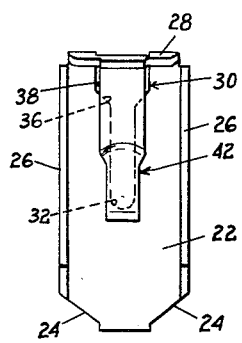
FIG. 4 is a front elevational view of the fastener illustrated in FIG. 3.
Figure 2:
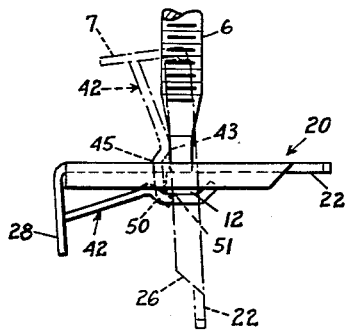
FIG. 2 is an enlarged elevational view illustrating the installing (dotted-line) and assembled or operating condition of the fastener of the present invention as secured to the ball portion of a ball point screw or stud.

Referring now, more particularly, to FIGS. 1 and 2 of the drawings, the fastener shown generally at 20 is illustrated in a typical application for securing the main plate 4 to the base plate 2 of an automatic player cabinet. In the form shown, the fastener 20 is utilized in conjunction with a ball point screw 6, the shank of which is adapted to be threadably secured in an aperture or hole 8 formed in the plate 4 and to extend through an aperture 10 in the base plate 2. As shown in FIG. 2, the fastener 20 is snapped into engagement with a protuberance or ball portion 12 on the screw 6 to permit adjustment of the plate position for the desired playing and shipping conditions, as will hereinafter be more fully described.

Figure 5:
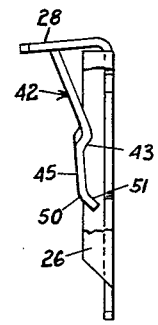
FIG. 5 is a side elevational view of the fastener illustrated in FIG. 4.
Figure 3:
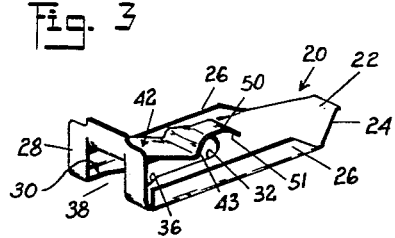
FIG. 3 is a perspective view illustrating the fastener per se in accordance with the present invention.
Figure 6:
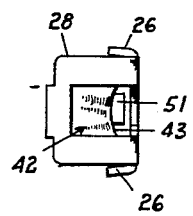
FIG. 6 is a top plan view of the fastener illustrated in FIG. 5.

In a preferred form, as illustrated in FIGS. 3 to 6, the fastener embodying the present invention is produced from a relatively small, inexpensive strip of sheet metal with a minimum loss or waste of material. The fastener may be made of any suitable sheet material, but preferably that of a spring metal nature, such as spring steel. The fastener may be provided with a base 22 of any desired shape, and having at its free end thereof tapered edge portions 24. Preferably, the fastener base 22 is formed adjacent its marginal edges with longitudinally upstanding ridge or flange portions 26 which strengthen and prevent deformation of the fastener, when utilized to bridge or span relatively large apertures or holes formed in the part with which the fastener is intended for use. The base 22 may be formed opposite its free end with an upstanding flange 28 which preferably extends at a slight acute angle toward the base, as best shown in FIG. 5. The base and flange, as shown, are formed intermediate their marginal edges with an enlarged slot 30 for the reception of the ball portion 12 of the ball point screw 6. That portion of the slot 30 formed in the base commences at a point generally intermediate its longitudinal ends and is of a width at one end 32 sufficient to slidably receive the reduced portion 34 of the ball point screw when in the transverse assembled position. As shown, the slot 30 tapers outwardly as at 36 toward the marginal edges of the base 22 and opens onto an enlarged portion 38 formed in the flange 28 so as to facilitate insertion of the ball portion 12 of the screw 6 when in the installing or assembling position of the fastener.

In a preferred form, the flange 28 is formed intermediate its marginal edges with an integral spring arm 42 which is cut from the metal which, when severed from the base and flange, forms the slot 30 and which extends angularly inwardly toward the base of the fastener. The arm may terminate at the end opposite the flange in a tongue 45 which is offset from the arm to provide a shoulder 43 and which terminates in a flared or hooked portion 50 which provides a shoulder 51. In the form shown, the shoulders 43 and 51 cooperate with the tongue to provide a recess into which the ball portion 12 of the screw may be inserted, and effectively held in assembled position, as best shown in FIG. 1.

Figure 9:
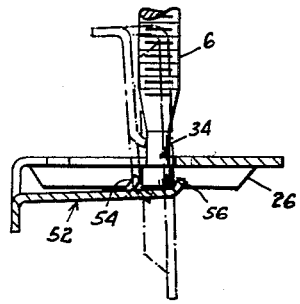
FIG. 9 is an enlarged elevational view of the modification of FIG. 7 illustrating the installing (dotted-line) and assembled or operating condition of the fastener of the present invention as secured to the ball portion of a ball point screw or stud.
Figure 7:
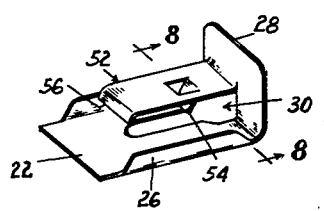
FIG. 7 is a perspective view illustrating a modification of the fastener.
Figure 8:
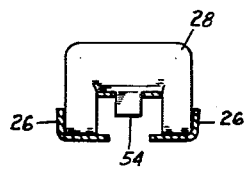
FIG. 8 is a cross sectional view taken along line 8—8 of FIG. 7 looking in the direction of the arrows.

In a modification shown in FIGS. 7–9, the flange 28 is formed with an integral spring arm 52 which extends generally normal therefrom and generally in the same direction as the base 22 of the fastener. As shown, the spring arm 52 is formed with a depressed tab or retaining shoulder 54 extending angularly inwardly toward the base which is adapted to yield outwardly upon the insertion of the ball portion 12 of the screw 6, and which is adapted to snap back into locking engagement therewith after such insertion of the ball point screw. As shown, the extremity or free end of the spring arm 52 terminates in an inwardly extending hook or retaining shoulder portion 56 which may extend generally normal from the spring arm 52 toward the base 22 and which prevents excessive axial movement of the ball point screw 6 during installing of the fastener. The hook 56 in conjunction with the depressed tab 54 operates to provide opposed retaining shoulders which lock or entrap the ball portion of the screw therebetween when in the transverse assembled position of the fastener.

Figure 10:
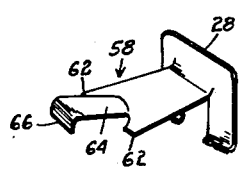
FIG. 10 is a perspective view illustrating another modification of the fastener.

In the modification illustrated in FIG. 10, the flange 28 is formed with an integral spring arm 58 which extends angularly inwardly toward the base of the fastener. The arm is formed at its outer end with retaining fingers 62 which extend in the same general direction as the arm and which coact together as a retaining shoulder to engage the ball portion 12 of the ball point screw 6 in the assembled position of the fastener. The outer end of the arm is provided intermediate the retaining fingers 62 with a locking tongue 64 of reduced cross-sectional dimension which extends angularly outwardly from the plane of the arm. The extremity or free end of the locking tongue 64 terminates in an inwardly extending hook or retaining shoulder portion 66 which may be bent normal with respect to the plane of the locking tongue. In this form, the hook or retaining shoulder portion 66 is adapted to prevent excessive axial movement of the ball point screw 6 during the installation of the fastener and coacts in conjunction with the retaining fingers 62 to provide opposed retaining shoulders which lock or entrap the ball portion 12 of the screw in the transverse assembled position of the fastener.

In a typical application of the fastener, the main plate 4 may be quickly and easily anchored to the base plate 2 of an automatic record player cabinet, to permit the desired adjustment for shipping or playing, as shown in FIGS. 1 and 2. This is effected simply by turning the screw 6 entirely through the threaded aperture 8 in the plate 4 and forcing the plate manually downwardly against the biasing force of the spring 3 into the shipping position, as shown by the dotted line 5 at FIG. 1. To install, the fastener is simply pushed onto the protruding ball portion 12 of the screw, which passes through the enlarged slot 38 formed in the flange 28 of the fastener. The spring arm 42 facilitates this initial step by gradually flexing outwardly relative to the base 22 of the fastener as the ball portion 12 of the screw cams over the retaining shoulder 43 on the inner side of the spring arm 42. By continuing to press the fastener upwardly, the ball portion 12 of the screw clears the retaining shoulder 43 and snaps into engagement with the inner surface of the locking tongue 45 and against the retaining shoulder 51 of the hooked portion 50 of the tongue which prevents further axial movement of the fastener relative to the screw. In this installing or vertical position as shown in dotted line at 7, the ball point screw 6 is held firmly against the base 22 of the fastener due to the pressure exerted on the ball portion 12 of the screw by the resilient locking tongue 45 of the spring arm 42. By this arrangement, cocking or the tendency of the screw to snap out of axial alignment with the fastener during such installation is reduced to a minimum.

To place the fastener in operating or in transverse assembled condition, the fastener is simply rotated to lie flat against the base plate 2 bridging the aperture 10 such that the reduced portion 34 of the screw extends through the complementary slot portion 32 of the base 22 of the fastener. The base thus overlies the ball portion 12 of the screw in such manner as to prevent axial movement of the screw relative to the base plate 2 of the cabinet. In this assembled condition, longitudinal movement of the fastener 20 relative to the screw 6 is prevented by the engaging relation provided between the opposed retaining shoulders 43 and 51 of the tongue 45 relative to the ball portion 12 of the screw. Moreover, in such assembled condition of the fastener 20, the main plate 4 of the cabinet may then be returned to its floating or playing condition under the influence of the resilient spring 3, whereby the screw 6 is held against upward movement by the entrapping relation of the fastener. To prepare the record player cabinet for shipping, the screw 6 is backed off, forcing the main plate 4 and down into the dotted line position, illustrated at 5, against the base plate 2. In such a position, the main plate is locked firmly thereon to prevent accidental or unintended damage to the components during shipping.

From the above description and accompanying drawings, it will be seen that the fastener of the present invention has many advantages. For example, the slot 30 may be formed by a single stamping process, and the fastening device may be formed by simple stamping and bending operations. The complete assembly is of a rigid unitary construction, which not only requires a minimum amount of material, and time to effect assembly or disassembly, but is of a strength sufficient to bridge holes or apertures of relatively large dimensions formed in the part to which the fastener is to be applied. No manipulation of threaded parts is required to effect quick and simple attachment and detachment of the fastener to and from the ball point screw, for enabling adjustment of the main plate relative to the base plate to be readily made for shipping or playing, as in the case, for example, of automatic record players. The construction is positive in action, since the fastener is held firmly against axial or cocking movement in the installing or vertical position, while the ball point screw is held firmly by the entrapping relation of the fastener in the assembled or operating condition.

Although in the foregoing description and accompanying drawings this disclosure is directed to preferred embodiments of the invention in relation to an automatic record player construction, it is obvious that the fastener or clip devices are applicable wherever in an operating manner it is desirable to secure members, such as plates or the like by means of a ball point screw or by means of screws having substantially similar configurations. Accordingly, while the invention has been described in relation to a preferred embodiment, such an example is

I claim:

1. A fastener comprising a base for engagement with the surface of a supporting panel, and a resilient arm carried by the base and extending from one end of the fastener in the same general direction as said base, said arm being spaced from said base so that the base extends generally intermediate the supporting panel and the arm in the assembled snap-fastening position of the fastener, said base having an elongated slot extending from one end of the fastener and disposed generally beneath said arm for receiving therethrough a protuberance on the shank portion of a stud or the like, said arm having spaced shoulders thereon for coacting engagement with the protuberance on the shank portion of said stud so that upon initial installation of said fastener the protuberance may pass freely through the elongated slot in said base and into camming engagement with an adjacent one of said shoulders, said protuberance acting to resiliently bias said arm outwardly away from said base until the protuberance passes beyond said last mentioned shoulder and into abutting engagement against the other of said shoulders, whereupon the arm yieldably snaps back in the general direction toward said base, and thereafter by pivotal movement of the fastener relative to said stud the protuberance is disposed between said shoulders and in overlying relationship with the elongated slot in said base in the final installed position of said fastener.

2. A fastener according to claim 1, wherein said resilient arm terminates at one end in a tongue-like portion which is offset outwardly from the plane of said arm to provide one of said shoulders, and wherein said tongue-like portion is provided at its terminal end with a hooked portion bent in the general direction of said base to provide the other of said shoulders.

3. A fastener according to claim 1, wherein said resilient arm includes a depressed tab portion extending in the general direction toward said base to provide one of said shoulders, and wherein said resilient arm terminates at its free end in a hooked portion bent in the general direction of said base to provide the other of said shoulders.

4. A fastener according to claim 1, wherein said resilient arm terminates at one end in a tongue-like portion which is offset outwardly from the plane of said arm, said arm including retaining fingers spaced on either side of said tongue-like portion to provide one of said shoulders, and wherein the tongue-like portion is provided at its terminal end with a hooked portion bent in the general direction toward said base to provide the other of said shoulders.

5. A fastener assembly comprising, a support panel or the like having an aperture therein and a stud-like member having a shank portion with a protuberance adjacent one end thereof extending through said aperture and adapted to secure an object to said panel, and a sheet metal fastener clip comprising a base for engagement with one side of said panel, a flange extending from said base adjacent one end of said clip, and a resilient spring-like arm extending from said flange in the same general direction as said base, said arm being spaced from said base so that the base extends generally intermediate the panel and the arm in the assembled position of said clip, said flange and base having an elongated slot therein extending generally beneath said arm, the end portion of said slot in said flange and base being relatively enlarged for receiving therethrough the protuberance on the shank portion of said stud-like member, said arm having shoulders disposed thereon for coacting engagement with the protuberance on the shank portion of said stud-like member, so that upon initial installation of the clip the protuberance passes in a generally vertical direction freely through the enlarged portion of said elongated slot and into camming engagement with an adjacent one of said shoulders, said protuberance acting to resiliently bias said arm outwardly from said base until the protuberance passes beyond said last mentioned shoulder and into abutting engagement against the other of said shoulders, whereupon the arm yieldably snaps back in the general direction toward said base, and thereafter, by pivotal movement of the clip relative to said stud-like member, the protuberance is disposed between said shoulders and in overlying relationship with the elongated slot in said base to firmly secure said base against said support panel in the final installed position of said fastener.

6. A fastener adapted to be secured to a protuberance on the shank portion of a stud or the like, comprising a base portion for engagement with the surface of a supporting panel, a flange extending from said base portion adjacent one end of said fastener, and an arm extending from said flange in the same general direction as the base portion, said arm being spaced from said base portion so that the base portion extends intermediate the supporting panel and the arm in a final position of the fastener, said flange and base portion having a slot therein disposed beneath the arm of said fastener, the end portion of the slot in the flange and base portion being enlarged for receiving the protuberance on the shank portion of a stud, the other end of the slot in the base portion of the fastener being narrower relative to the protuberance on the shank portion of said stud, said arm having shoulders disposed thereon for engagement with the protuberance on the shank portion of said stud, whereby the protuberance on said stud may pass freely through the enlarged portion of said slot and gradually press the arm away from the base portion of the fastener until engagedly retained by the shoulders of said arm, and thereafter by relative pivotal movement of the fastener the protuberance on said stud is disposed in the final position of the fastener to overlie the base portion of the fastener adjacent the narrower end of the slot therein.

References Cited in the file of this patent

UNITED STATES PATENTS

| | | |
|---|---|---|
| 2,115,312 | Lombard | Apr. 26, 1938 |
| 2,252,904 | Todd | Aug. 19, 1941 |
| 2,358,837 | Tinnerman | Sept. 26, 1944 |
| 2,748,906 | Flora | June 5, 1956 |